INVENTORS
OTTO ALBERT KRAUER
HERBERT FREDERICK VOIGT
HARVEY RONALD SCHOR

BY ATTORNEY

United States Patent Office 3,433,326
Patented Mar. 18, 1969

3,433,326
ELEVATOR CONTROL SYSTEM
Otto Albert Krauer, Tuckahoe, Herbert Frederick Voigt, Flushing, and Harvey Ronald Schor, Rockaway Park, N.Y., assignors to Otis Elevator Company, New York, N.Y., a corporation of New Jersey
Filed Oct. 13, 1965, Ser. No. 495,446
U.S. Cl. 187—29          19 Claims
Int. Cl. B66b 1/36, 1/52

ABSTRACT OF THE DISCLOSURE

A landing selector arrangement used in an elevator system controls the car actuating and stopping mechanism. One member moveable in advance of the movement of the elevator car is aligned with a position corresponding to a selected landing by comparing a fixed signal representing the landing with a variable signal representing the position of the member. The error signal resulting from this comparison is applied through a servo amplifier to a motor which drives the member until it attains proper alignment. Once aligned, this one member co-acts through a differential mechanism with another member whose position represents the position of the elevator car to produce throughout the deceleration of the car and until it stops at the selected landing a continuous signal indicative of the distance of the car from that landing. This signal is suitable to control the car actuating and stopping mechanism to decelerate the car to stop it at the selected landing and to maintain it level with that landing.

---

This invention relates generally to elevator control systems and particularly to an improved selector, or floor controller, for use in such systems.

A selector is a device, usually located in the machine room, which scans the floors in advance of the actual position of the elevator car to determine the next floor for which a call requiring a stop has been registered. Upon receipt of such a call, the selector generates suitable signals to control the hoist motor to decelerate the car to a very slow speed from which it can be stopped, usually by an auxiliary leveling device, exactly at the floor level.

Various kinds of selectors for performing the above functions have been used in the past. Most have included one or more carriages or panels moved up and down, at a reduced scale, in synchronism with and/or in advance of the movement of the car. One disadvantage of such prior selectors is their large size, especially in tall buildings, even when the scale factor is reduced as much as is practical. Another disadvantage of most prior selectors is that the receipt of a call to stop has caused the advance panel or carriage to be brought to an abrupt stop, generating high stresses due to impact. Another disadvantage of prior selectors is that a great deal of time has been required to install and adjust them properly.

It is a general object of the present invention to provide an improved selector.

Another object is to provide a selector which is much smaller than prior selectors for the same length of hoistway.

Another object is to provide a selector in which impact loads due to stopping of an advancer mechanism have been eliminated.

Another object is to provide a selector capable of generating signals with sufficient accuracy to control the leveling operation, thereby eliminating the need for auxiliary leveling devices in either the machine room or the hoistway.

Another object is to provide a selector so constructed that most adjustments can be made at the factory and so that but little time is required to install and adjust it properly at the job site.

It has been proposed in the past to incorporate the hoist motor into a servo mechanism so as to control the elevator car at all times in accordance with an input signal of desired form. One of the problems encountered has been that of generating a suitable input signal and especially generating that portion of the input signal which controls the deceleration, leveling, and stopping of the car. Prior selectors have been incapable of providing such a signal with sufficient accuracy. Accordingly, it is another object of the invention to provide a selector capable of generating a signal of the proper form and with sufficient accuracy to be used for controlling an elevator hoisting servo mechanism during deceleration, leveling, and stopping of the car.

Briefly stated, one embodiment of the invention comprises a first or synchronous member, such as a first shaft, positioned by the elevator car as usual. A second member, which in this embodiment comprises a second shaft and a connected element fastened to an endless belt is operatively connected to a small advancer motor. Means such as a mechanical differential are provided for positioning a third member, a third shaft, in accordance with the difference between the angular positions of the first and second members, or shafts. When the elevator car is to be started, the advancer motor is energized to turn the second shaft in advance of the first so that the element fastened to the endless belt scans ahead for stop calls. Owing to the mechanical differential the third shaft is also rotated when the second moves in advance of the first. When a stop call is detected, the advancer motor is controlled to position the second shaft precisely at a position corresponding to the floor at which the stop is to be made. This is done with a servo mechanism which compares a varying voltage indicative of the angular position of the second shaft with a fixed voltage indicative of the height of the particular floor. With the second shaft positioned at the position corresponding to the floor, the angular position of the third shaft with respect to that of the first shaft represents the distance of the car from he desired destination, or its "distance to go." Various signals representing this distance or functions thereof can be generated by apparatus controlled by the third shaft.

For a clearer understanding of the invention, reference may be made to the following detailed description and the accompanying drawing, in which.

General description

Figures 1, 6:
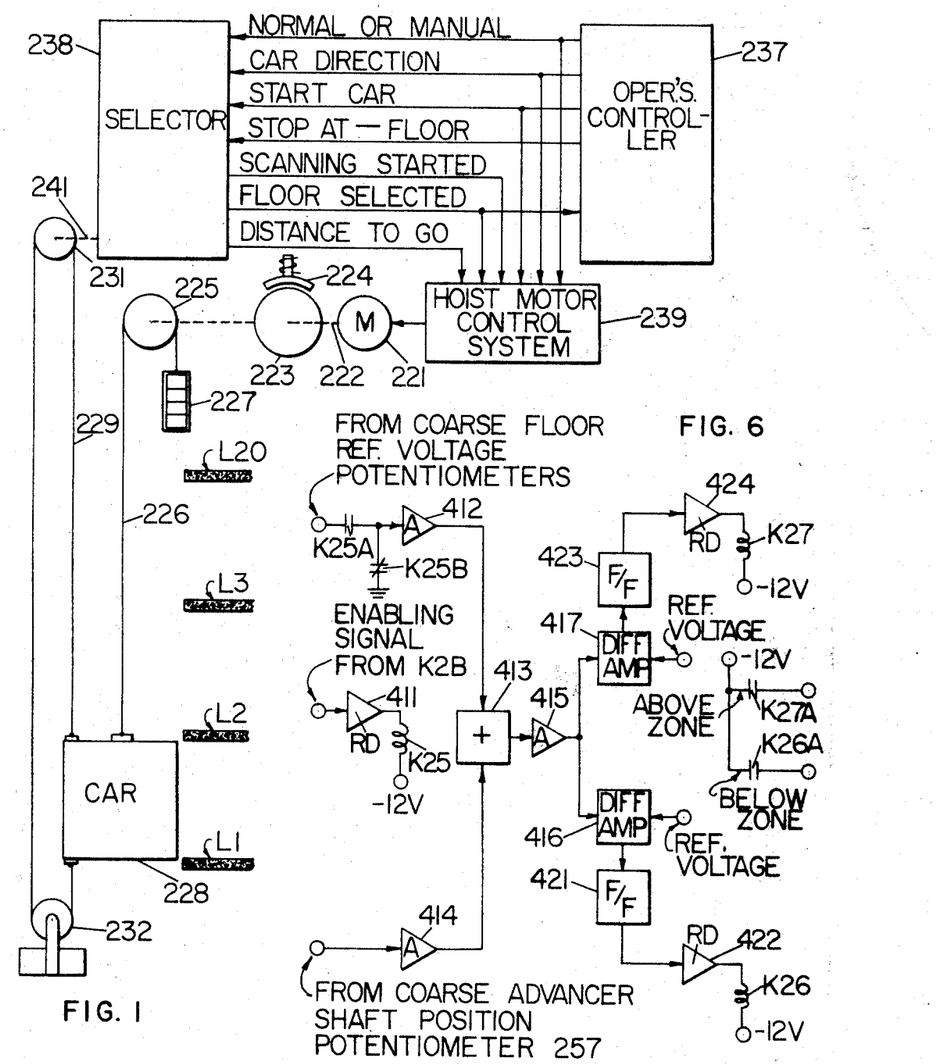
FIGURE 1 is a schematic block diagram of an elevator system.
FIGURE 6 is a schematic diagram, partly in block form, of the comparator shown in block form in FIGURE 3b.

Referring first to FIGURE 1 there is shown a motor 221 connected to a shaft 222 which rotates a brake drum 223 which cooperates with a brake shoe 224. The brake shoe 224 is applied to the drum 223 by means of a spring and is released by the energization of an electromagnet in accordance with standard elevator practice. The shaft 222 is also connected to a traction sheave 225 over which passes a hoist rope 226 opposite ends of which are connected to a counterweight 227 and an elevator car 228.

The car 228 serves a number of landings, for example twenty of them, L1 to L20 inclusive. A steel tape 229 formed with sprocket holes is fastened to the car 228 and engages a sprocket 231 in the machine room and passes over a tension sheave 232 in the pit.

The equipment which controls the operation of the car 228 is arbitrarily divided into three parts, the operations controller 237, the selector 238 and the hoist motor control system 239. All of the control functions are presumed to be performed by one of these three items of equipment.

The operations controller performs the function of programming the operation of the car, dispatching the car, operating the hall lanterns, and processing the calls received from car and hall buttons. The operations controller generates a signal indicating whether the car is to be operated in the normal manner or manually operated, as may be necessary for inspection or repairs. This signal is passed both to the selector 238 and the hoist motor control system 239. The operations controller also generates a signal indicative of the direction the car is to travel and generates another signal when the car is to be started. These signals are likewise passed to the selector 238 and the motor control system 239. The operations controller also generates a signal to indicate that the car should stop at a particular floor to discharge and/or pick up passengers.

The selector 238 performs the functions of advance scanning for stops and of assisting the control system 239 in decelerating the motor 221. The selector 238 receives not only the previously mentioned signals from the operations controller 237 but also receives continuously information indicative of the position of the car 228 in the hoistway, which information is in the form of the angular position of a first or input shaft 241 which is operatively connected to the sprocket 231. Upon receipt of the "start car" signal, the selector scans the floors in advance of the elevator car to determine the next floor for which a call requiring a stop has been registered. As soon as the scanning operation has actually started, the selector generates a signal indicative of this fact and passes it to the control system 239. Upon detection of and action in response to a call to stop, a signal indicative of this fact, namely that a floor has been selected at which a stop is to be made, is generated and sent to the operations controller 237 nad to the control system 239. Also, at this time, a signal is generated and sent to the control system 239, indicative of the present distance between the car 228 and the selected landing.

The hoist motor control system 239 controls the energization and deenergization of the motor 221 and also controls the application and release of the brake 224. The system 239 may be a so called "open speed loop" system or may include feedback and operate in a "closed loop" mode. In either case, actual energization of the motor may be controlled in various ways such as by a Ward-Leonard system utilizing a continuously rotating generator or by resistors, electron tubes, or solid state devices which control energization of the motor 221 directly. The selector about to be described is suitable for use with any of these systems but it is believed that it will find its principal application in connection with high performance servo arrangements because this selector is capable of meeting the severe demands imposed by such configurations.

Figure 2:
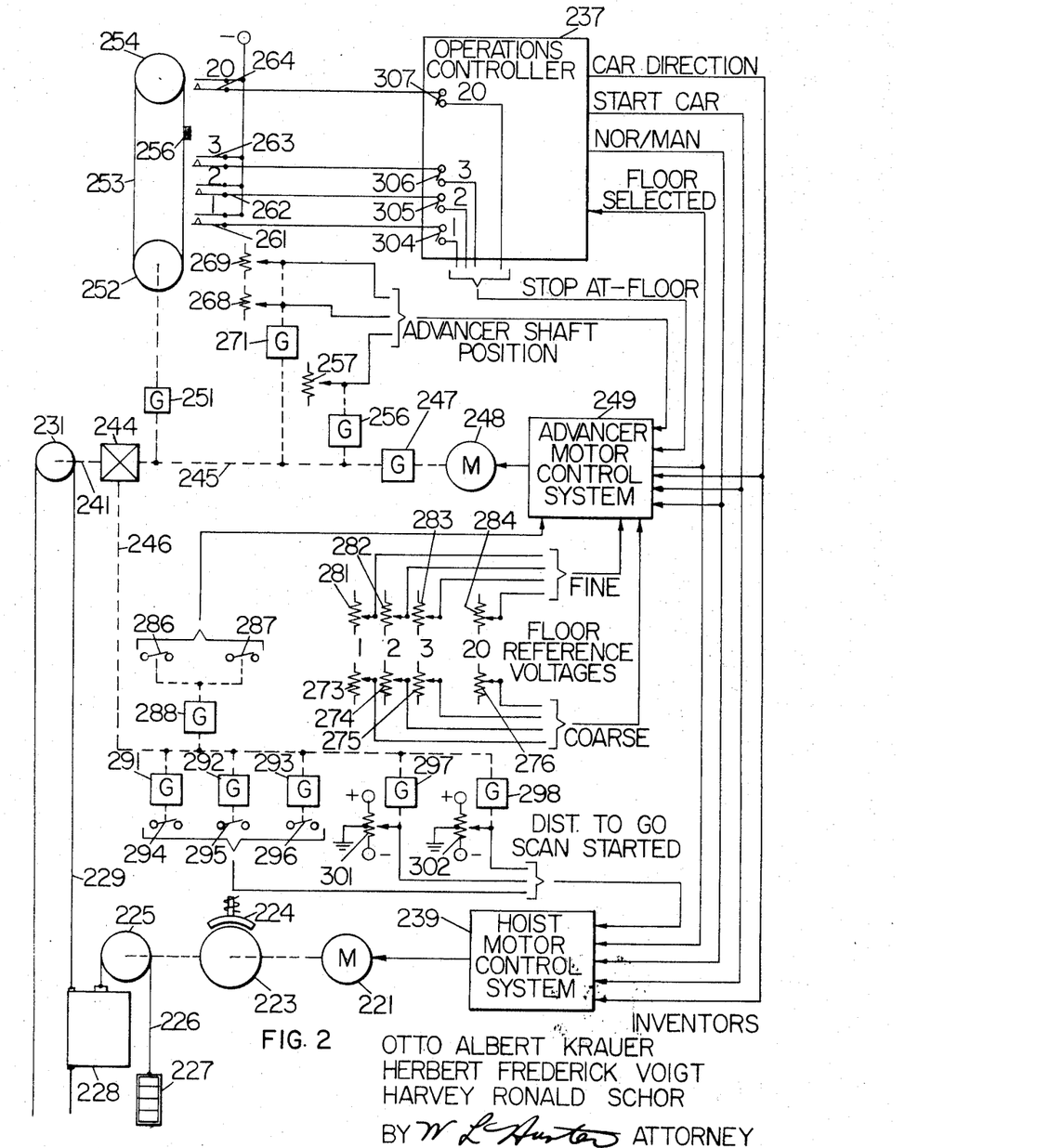
FIGURE 2 is a schematic diagram, partly in block form, of the selector shown in FIGURE 1.

Referring now to FIGURE 2, the previously mentioned first, or input shaft 241 is connected to one terminal of a mechanical differential 244. Another terminal of the differential is connected to a second or "advancer" shaft 245, so called because this shaft is positioned in advance of the first shaft 241 to search for calls to stop the car. The remaining terminal of the differential is connected to a third shaft 246 sometimes called the "difference" shaft because its angular position is the difference between the positions of the shafts 241 and 245. This shaft is also sometimes referred to as the "distance to go" shaft because after floor selection, the angular position of this shaft represents the distance the elevator car has yet to go to the selected landing.

The shaft 245 is connected through a suitable gear box 247 to an advancer motor 248 which is controlled by an advancer motor control system 249. The shaft 245 is also connected through another gear box 251 to a sprocket 252 around which is passed a timing belt 253 which also passes around an idler sprocket 254. The timing belt 253 is the usual variety formed with teeth so that there is no slippage between it and the sprocket 252. A small permanent magnet 256 is fastened to the outside of the belt 253 and constitutes an element of a scanning mechanism which seeks out the next floor at which a stop is to be made. The length of the belt 253 is selected to represent, to a reduced scale, a distance equal to or greater than the complete length of the hoistway. Stated another way, the length of the belt 253 and the ratio of the gear box 251 are selected so that if the shaft 246 were to be held stationary and the car 228 were to traverse the entire length of the hoistway, the magnet 256 would make no more than one complete trip around the path of the belt. In other words, each point along the path of travel of the magnet 256 represents a corresponding point in the hoistway, although in operation the position of the magnet 256 does not always, or even usually, represent the position of the car 228.

A plurality of switches, one for each landing to be served by the car, are positioned adjacent to the belt 253 in proximity to the path of movement of the magnet 256. Four of these switches, the switches, 261, 262, 263 and 264 are shown in FIGURE 2. These switches are positioned at approximately the scale distance apart of adjacent floors and although they have been shown schematically as all being adjacent to the right of the belt and sprockets, it will be understood that they may be located at any appropriate point around the outside of the loop including the region around the sprockets 252 and 254. The switches preferably are of the so called "reed" type which are actuated by the presence of a magnetic field. Thus, each switch is closed whenever the magnet 256 is closely adjacent thereto.

Also connected to the shaft 245 through an appropriate gear box 256 is the wiper of a potentiometer 257. The ratio of the gear box 256 is selected so that for each possible position of the magnet 256 there is but one possible position of the wiper of the potentiometer 257. In other words, the position of the wiper and the potential thereof are unambiguous, although coarse, indications of the position of the shaft 245 and the magnet 256. Two additional potentiometers 268 and 269 have their wipers mechanically connected together and, through gear box 271 to the shaft 245. The latter two wipers make several revolutions for each revolution of the wiper of the potentiometer 257 and each provides a fine indication of the position of the shaft 245. Two potentiometers are required for this purpose for reasons which will more fully appear later.

A plurality of potentiometers, one for each floor, four of which, the potentiometers 273, 274, 275 and 276 are shown in FIGURE 2 are for providing voltages indicative of the distance of each floor from a reference position, for example, from the pit. These potentiometers provide a coarse, unambiguous distance indication. A plurality of different potentiometers, one for each floor, four of which, the potentiometers 281, 282, 283 and 284 are shown in FIGURE 2, are for providing fine indications of the distance of each floor from its reference position. All of these floor reference voltage potentiometers, both the fine and coarse, are adjusted once and then left fixed. The voltage of each is passed to the advancer motor control system 249.

A pair of switches 286 and 287 are mechanically connected through a gear box 288 to be operated by the difference shaft 246 when the latter reaches opposite limits of travel. These switches are electrically connected to the advancer motor control system 249 and are provided to limit the advance of the shaft 245 and the magnet 256 and to limit the displacement of the shaft 246 as will be more fully explained. The difference shaft 246 is also connected through appropriate gear boxes 291, 292 and 293, to operate various switches such as the switches 294, 295 and 296. These switches are illustrative of those which can be used to indicate various discrete positions of the shaft 246. Also connected to the shaft 246 are two gear boxes 297 and 298 which in turn are connected to two potentiometers 301 and 302. The latter potentiometers are for the purpose of providing voltages indicative of the angular position of the shaft 246 which position always represents the distance between the car and the region being scanned and which, during stopping, represents distance of the elevator car from the desired landing. Typically, each potentiometer may have a grounded center tap and have its extremities connected to voltages of opposite polarities with respect to ground, as shown, so that the potentials of the wipers may indicate, by their polarity and magnitude the direction and distance of the car from the selected landing. These potentiometers may be linear or non-linear depending upon the requirements of the hoist motor control system being used. One embodiment of such potentiometers is fully disclosed in the co-pending application of Otto Albert Krauer et al., Serial No. 495,585, filed concurrently herewith for "Elevator Control System," and assigned to the same assignee as is the instant application.

As previously mentioned, the operations controller 237 generates a signal calling for a stop at a floor for which a car or hall button has been pressed. This signal can take various forms but it will be assumed for present purposes that the signal consists of the closure of the contacts of a switch. There is one switch for each floor, four of which, the switches 304, 305, 306 and 307 are shown in FIGURE 2. These switches have been shown schematically as mechanically operated switches but it will be understood that electronic switches may be used.

Corresponding terminals of all of the reed switches 261, 262, 263 and 264 are connected together and to a source of negative voltage. The other terminal of each switch is, in effect, connected to one terminal of the corresponding switch in the operations controller. The other terminals of the latter switches are connected to the advancer motor control system 249. The details of these connections will be more fully described subsequently.

The operation of the selector may now be briefly described. Let us assume that the elevator car is in normal operation, that it is at the first floor, and is about to go up. The operations controller generates a "start car" signal which is passed to the advancer motor control system 249 which energizes the motor 248 to rotate the shaft 245 rapidly. Rotation of the shaft operates, through the differential 244, to rotate the shaft 246, and as soon as the latter starts to move, one of the switches, such as the switch 294, is actuated thereby sending a signal to the hoist motor control system 239 which indicates that scanning has started. The "start car" signal from the operations controller is also passed to the hoist motor control system 239 and this signal, in conjunction with the "scanning started" signal, causes the system 239 to energize the motor 221 so as to start and accelerate the car 228.

Rotation of the shaft 245 also rotates the sprocket 252 thereby driving the belt 253 and the magnet 256. As the magnet 256 passes adjacent to the switches 262 and 263, each of these switches is actuated. Let it be assumed that no calls are registered to stop the car at this time. Accordingly the actuation of each of the switches 262 and 263 has no effect. The shafts 245 and 246 are rotated rapidly and soon the shaft 245 and the magnet 256 have been driven in advance of the shaft 241 a distance somewhat greater than is required to stop the car in the proper manner when running at full rated speed. This distance is represented by the displacement of the shaft 246 and is the displacement at which the switches 286 and 287 are adjusted to operate. Actuation of one of these switches, such as the switch 286 for example, causes the advancer motor control system 249 to deenergize the motor 248 thereby stopping the shaft 245. The shaft 241 driven by the elevator car 228 now drives the shaft 246 in the opposite direction until the switch 286 is reactuated. Such reactuation causes the motor 248 to be energized thereby advancing the shafts 245 and 246. The process is now repeated with the shaft 245 advancing intermittently thereby maintaining the shaft 246 near its limit of travel. Such operation continues until a call to stop the car is registered.

Let it now be assumed that the operations controller directs that the car be stopped at the twentieth floor. Such direction is registered by the closure of the switch 307. When the magnet 256 approaches the switch 264 the latter is closed thereby sending a negative signal through the switches 264 and 307 to the advancer motor control system 249. One of the first things that occurs there is the generation of a "floor selected" signal which is sent to the operations controller 237 for the purpose of cancelling the call, illuminating the proper hall lanterns, etc. This same signal may also be sent to the hoist motor control system 239 because certain kinds of these systems use such a signal to enable deceleration control circuits.

At about the same time, the floor reference voltage potentiometers for the twentieth floor, the potentiometers 276 and 284, become active as do the shaft position potentiometers 257, 268 and 269. The motor control system 249 compares the voltages of these potentiometers and controls the motor 248 to position the shaft 245 precisely at a position corresponding to the twentieth floor. It is to be noted that the position of the shaft 245 is determined at this time by the voltage of these potentiometers and not by the physical position of the switch 264. The switches 261–264 need be positioned only with sufficient accuracy to initiate the floor selection operation.

With the shaft 245 held stationary by the motor 248, the shaft 241 drives the shaft 246. Since the shaft 245 is at a position corresponding to the twentieth floor, the angular position of the shaft 246 represents the distance that the car 228 has yet to go to reach the twentieth floor. Signals representing this distance to go, consisting of the voltages of the potentiometers 301 and 302 and the condition of the switches such as the switches 294, 295 and 296, are passed to the hoist motor control system 239, which in response thereto controls the motor 221 to bring the car 228 to a smooth stop at the twentieth floor.

*The advancer motor control system*

Figure 3A:
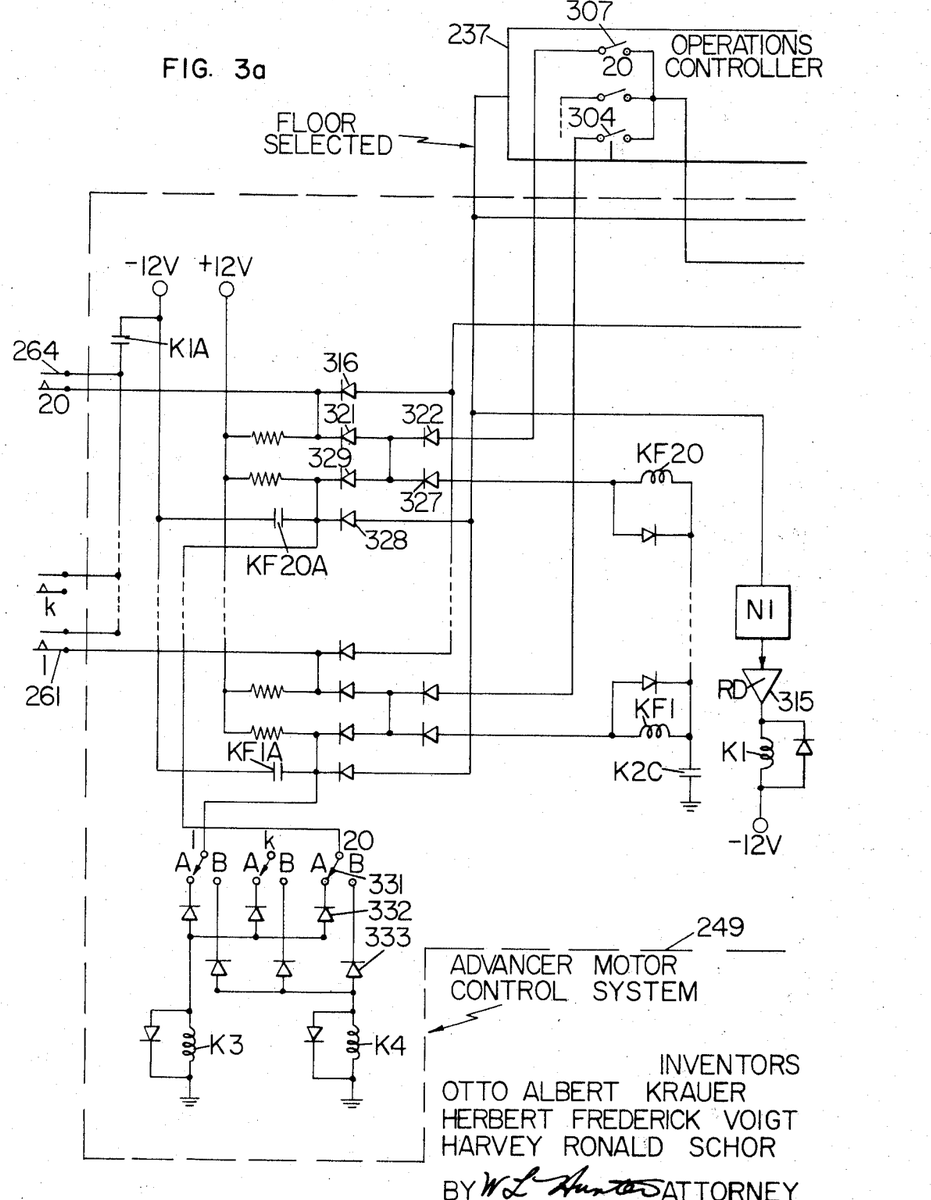
FIGURES 3a and 3b taken together, are a schematic diagram, partly in block form, of the advancer motor control system shown in block form in FIGURE 2.
Figure 3B:
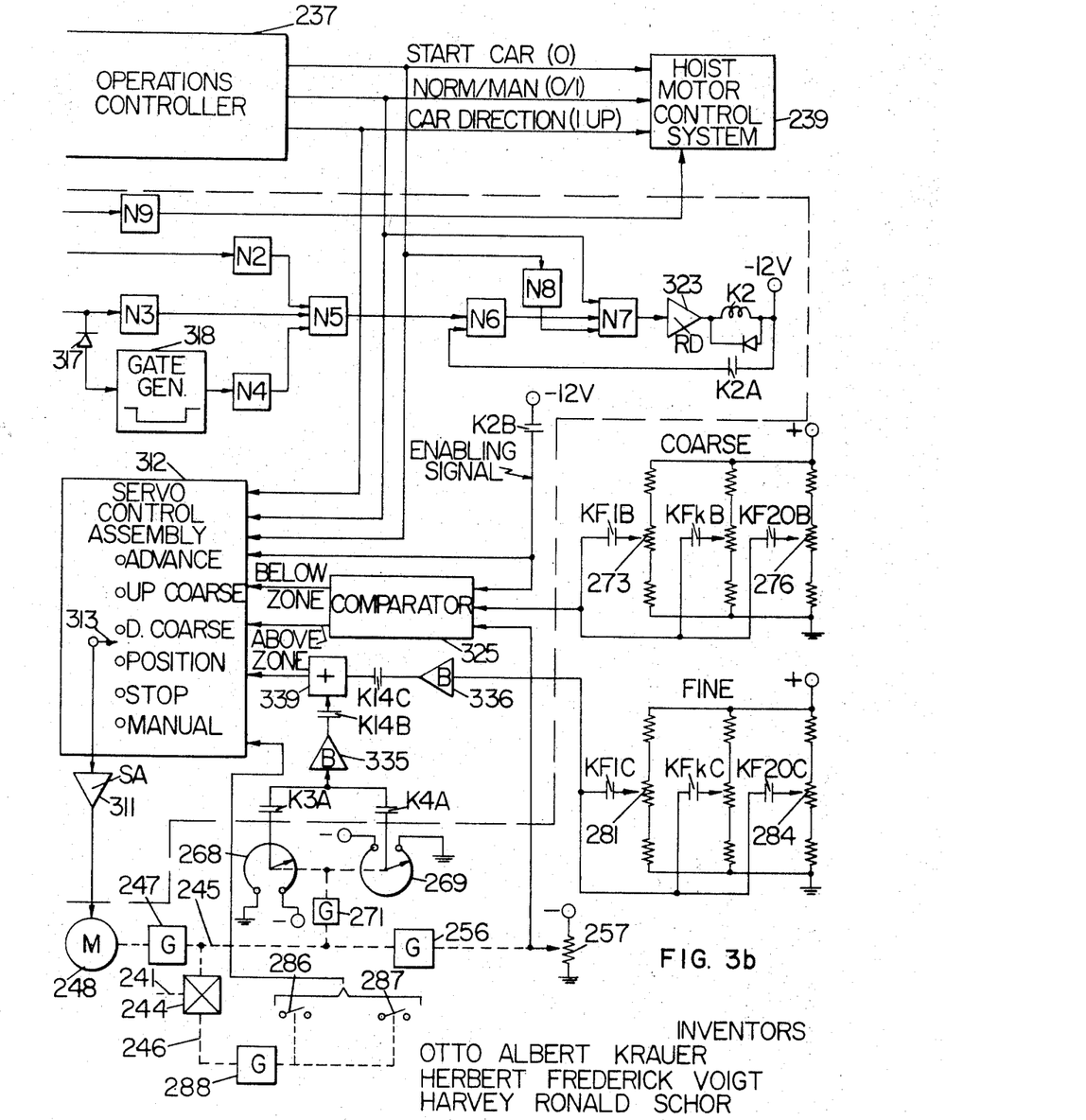

FIGURES 3a and 3b together are a schematic diagram of the advancer motor control system. This apparatus makes use of both analogue and digital technigues. Some of the conventions and symbols used will first be explained.

(1) The various analogue quantities and signals are direct current rather than alternating current.

(2) The binary "zero" is represented by zero volts; the binary "one" is represented by −12 volts.

(3) Relays operate on 12 volts D.C.

(4) "NOR" logic elements are used. A "NOR" circuit may have one or more inputs each of which is either "zero" or "one." The single output of a "NOR" circuit is "one" when and only when all inputs are "zero." "NOR" circuits are here represented by a rectangle with a capital N.

(5) A relay drive amplifier is a polarity reversing amplifier for supplying sufficient power to operate a relay. Relay drive amplifiers are here represented by the usual triangular amplifier symbol with the letters RD thereon.

(6) A buffer amplifier, or buffer, is an amplifier with approximately unity gain which does not reverse the polarity and which is used to isolate the output from the input. Buffers are here represented by the usual triangular amplifier symbol with the letter B thereon.

Referring now to FIGURES 3a and 3b, there is shown the shaft 245 driven by the motor 248 which in turn is controlled by a servo-amplifier 311. This amplifier causes the motor to run in one direction or the other according to the polarity of the input and varies the speed of the motor according to the magnitude of the input.

The previously mentioned coarse position potentiometer 257 may be a ten turn potentiometer, ten full turns of which may represent the entire height of the hoistway. The previously mentioned fine position potentiometers 268 and 269 are each one turn potentiometers capable of being driven continuously in either direction through zero. While one turn of the coarse position potentiometer 257 may, for example, represent sixty feet of hoistway, one turn of the potentiometers 268 and 269 may, for example, represent only six feet. Each has a useful range of somewhat less than 360° so that during a predetermined portion less than the total movement of shaft 245 and thus magnet 256, the wiper on each potentiometer 268 and 269 will pass from its usable resistance portion through an unusable portion. For this reason two potentiometers are required and they are physically mounted so that the wipers of both rotate in unison but go through the transition from full voltage to ground 180° apart as shown in FIGURE 3b. Only one of them is used at any one time. When the shaft 245 is at a position corresponding to the first floor, for example, that potentiometer whose wiper is farthest removed from the transition point is selected by a manual switch for that floor and thereafter is the only one used for that floor. One of the two potentiometers is selected for each floor as will be more fully explained.

The input for the servo-amplifier 311 is obtained from a servo control assembly 312. The amplifier input is, in effect, connected to a switch 313, shown as if it were a single pole multi position switch. As will be explained in connection with FIGURES 4 and 5, this switch is really a number of relay contacts. However, for present purposes it will be assumed to be as shown in FIGURE 3b. The first position for this switch is designated the "advance" position at which position a signal is applied to the servo-amplifier 311 of the proper polarity and magnitude to operate the motor 248 at a predetermined high speed in the proper direction. The second and third position, designated "Up Coarse" and "Down Coarse" each apply a signal which causes the motor 248 to run at a moderate speed as long as the signal is applied. When the switch 313 is connected to the "Position" tap an error signal is applied to the servo-amplifier 311 which is obtained by comparing the output of one of the fine floor reference voltage potentiometers with the voltage of one of the fine position potentiometers 268 or 269. This causes the shaft 245 to be positioned precisely at the position corresponding to the selected floor. When the switch 313 is connected to the "Stop" tap, zero voltage is applied to the servo-amplifier 311 and the motor stops. The "manual" tap is used only when the elevator is under manual control such as during installation or when making repairs.

Circuits for the first floor and the twentieth floor are shown as well as parts of the circuit for the kth floor, that is any one of the floors 2-19 inclusive.

The apparatus can bes be understood by considering an example. Let us assume that the elevator is at the first floor about to go up and that a stop call is registered for the twentieth floor. When power is first applied, a relay K1 is energized because the input of the "NOR" circuit N1 is zero volts. This makes the output "one" which is applied to a relay drive amplifier 315 making its output "zero." One terminal of the relay winding K1 is connected to the output of the relay drive amplifier 315 while the other terminal is connected to a negative 12 volt source. Therefore, the relay is energized. Closure of its contact K1A places −12 volts on one terminal of each of the floor switches 261, 264, etc.

The car is started in response to a "start car" signal from the operations controller 237 which signal is zero when it is desired to start the car. This signal is applied to the servo control assembly 312 and connects the switch 313 to the "advance" tap. A suitable voltage is applied to the servo-amplifier 311 so that it energizes the motor 248 so as to advance the shaft 245 rapidly in the "up" direction. Since it has been assumed that no stop calls are registered below the twentieth floor, the shaft 246 will quickly reach its limit of travel and be alternately stopped and driven forward, as previously discussed, until a stop call is detected. Such a call is detected, in the present example, when the magnet 256 approaches the switch 264. Closure of this switch causes several things to happen.

(1) −12 volts is applied through the switch 264 and a diode 316 to the input of a "NOR" circuit N3 the output of which becomes one of the inputs to a "NOR" circuit N5. Since the input to circuit N3 is "one," the input to N5 is "zero."

(2) −12 volts is also applied through the diode 316 and another diode 317 to a gate generator 318 which generates a negative going gate the duration of which is adjustable in the range from about 3 to 20 milliseconds. This gate is applied to a "NOR" circuit N4 whose output is therefore "zero" during the gate and which output is another input to the "NOR" circuit N5.

(3) The negative signal passing through the switch 264 also passes through diodes 321 and 322 to one terminal of the switch 307 the other terminal of which is connected as an input to a "NOR" circuit N2 the output of which constitutes a third input to the "NOR" circuit N5. The switch 307 will be closed because it has been assumed that a call has been registered for the twentieth floor. Accordingly, the input to N2 is "one," and the output is "zero." Since all the inputs to the "NOR" circuit N5 are "zero," its output is "one" and is applied as an input to the "NOR" circuit N6. The other input to the "NOR" circuit N6 is connected to a contact K2A which is open at this time so that this input is "zero." Therefore the output of the "NOR" circuit N6 is "zero" and is applied as an input to the "NOR" circuit N7. A second input to the "NOR" circuit N7 is obtained from the normal/manual output of the operations controller 237 which is "zero" during normal operation. The "start car" signal from the operations controller, which is "zero" when the car is to be started, is also connected to the input of the "NOR" circuit N8 the output of which constitutes a third input of the "NOR" circuit N7. Since the car has long since started and is traveling from the first to the twentieth floor the "start car" signal is now a "one" and the output of the "NOR" circuit N8 is "zero." Since all inputs to the "NOR" circuit N7 are "zero," the output thereof is "one" and is applied to the input of a relay drive amplifier 323 the output of which is connected to one terminal of a relay winding K2 the other terminal of which is connected to a −12 volt source. Therefore the relay K2 is energized.

Summarizing the effects of the above discussed logic circuits, the relay K2 is energized provided that the switches 264 and 307 are closed; that the gate from the generator 318 is present; that the "start car" signal is absent; and that the elevator is in "normal" operation as contrasted to "manual."

The energization of relay K2 closes contacts K2A which are connected to place a "one" input on the "NOR" circuit N6 so that the relay K2 will remain energized even after the gate has terminated or if one or both of the switches 264 and 307 should open.

Closure of contacts K2B generates an enabling signal which is connected both to the servo control assembly 312 and to a comparator 325.

Closure of contacts K2C completes the ground circuit for all of the floor relays KF1 to KF20 inclusive.

The relay KF20 is energized through a circuit which can be traced from a −12 volt source through the contacts K1A, the switch 264, the diode 321 and a diode 327 to one terminal of the relay winding KF20 and from the other terminal through the contacts K2C to ground. Closure of contacts KF20A connects the −12 volt source through these contacts and through a diode 328 to the input of the "NOR" circuit N1, making this input "one." The output of the "NOR" circuit N1 is therefore "zero" thereby making the output of the relay drive amplifier 315 "one" which deenergizes the relay K1. Opening of the contacts K1A disconnects the −12 volt source from the switches 261–264 etc., thereby preventing further stop calls from being answered at this time. Closure of contacts KF20A also provides a holding circuit for the winding of relay KF20 through these contacts, a diode 329 and the diode 327. Closure of contacts KF20A also generates a "floor selected" signal, through the diode 328, which is passed directly to the operations controller 237 and also passed through a "NOR" circuit N9 to the hoist motor control system 239.

Closure of contacts KF20A also puts a −12 volt potential on the arm of a single pole double throw switch 331, which is one of twenty similar switches, one for each floor, connected to corresponding floor relay contacts. The switch 331 is positioned once, at the time of installation, to select that one of potentiometers 268 or 269 whose wiper is farthest from the transition point when the car is at the twentieth floor. The "A" contact of the switch 331 is connected through a diode 332 to one terminal of a relay winding K3 the other terminal of which is grounded. The "B" contact of the switch 331 is connected through a diode 333 to one terminal of a relay winding K4 the other terminal of which is grounded. Contacts K3A and K4A in the circuits of the wipers of the potentiometers 268 and 269 connect the proper potentiometer to a buffer amplifier 335.

Closure of contacts KF20B connects the coarse reference voltage potentiometer 276 to the comparator 325.

Closure of contacts KF20C connects the fine reference voltage potentiometer 284 to a buffer amplifier 336.

The coarse shaft position potentiometer 257 provides an unambiguous indication of the position of the shaft 245 but this indication is not sufficiently accurate for all purposes. It is, however, accurate enough to determine whether the shaft 245 is within a fine position zone, that is, within the range of a single turn of the fine position potentiometers 268 and 269. To make this determination, the voltage output of the potentiometer 257 is compared, by the comparator 325, with the voltage output of the potentiometer 276. The comparator 325 generates two output signals, the first indicative of whether the shaft 245 is or is not below the fine position zone and second indicative of whether the shaft 245 is or is not above the fine position zone. These signals are passed to the servo control assembly 312.

It is desired to stop the shaft 245 at a position corresponding precisely to the twentieth floor. At the time when the operations above described started to occur, the switch 313 was in the "advance" position so that the motor 248 may have been driving the shaft 245 at high speed. In order to stop the shaft quickly, the enabling signal, generated by the closure of contacts K2B and passed to the servo control assembly 312, in effect turns the switch 313 to the "stop" position, where it is held momentarily, unless the signals from the comparator 325 show that the shaft 245 is already in the fine position zone in which case the switch 313 is turned directly to the "position" tap. However, in general the shaft 245 will not be in the fine position zone at this time and the switch 313 will be turned to the "stop" position. After being held in this position momentarily, the signals from the comparator 325 become fully effective to control its position. If the signals from the comparator now indicate that the shaft is above the fine position zone, the switch 313 is, in effect, turned to the "Down Coarse" position at which an appropriate signal is fed to the servo-amplifier 311 to drive the shaft rapidly down. If the comparator indicates that the shaft is below, the switch 313 is turned to the "Up Coarse" position at which an appropriate signal is generated which drives the shaft up. When the shaft reaches the fine position zone, one of the fine position potentiometers 268 and 269 and the fine reference potentiometer 284 are connected through buffer amplifiers 335 and 336 and through relay contacts K14B and K14C, the windings for which will be described subsequently, to a summing circuit 339 which generates an error signal which is sent to the servo control assembly 312. The switch 313 is now turned to the "position" tap at which the error signal is connected to the servo-amplifier 311. The shaft 245 is therefore driven quickly to the precise position corresponding to the desired floor at which position it is held by the motor 248.

*The servo control assembly*

Figure 4:
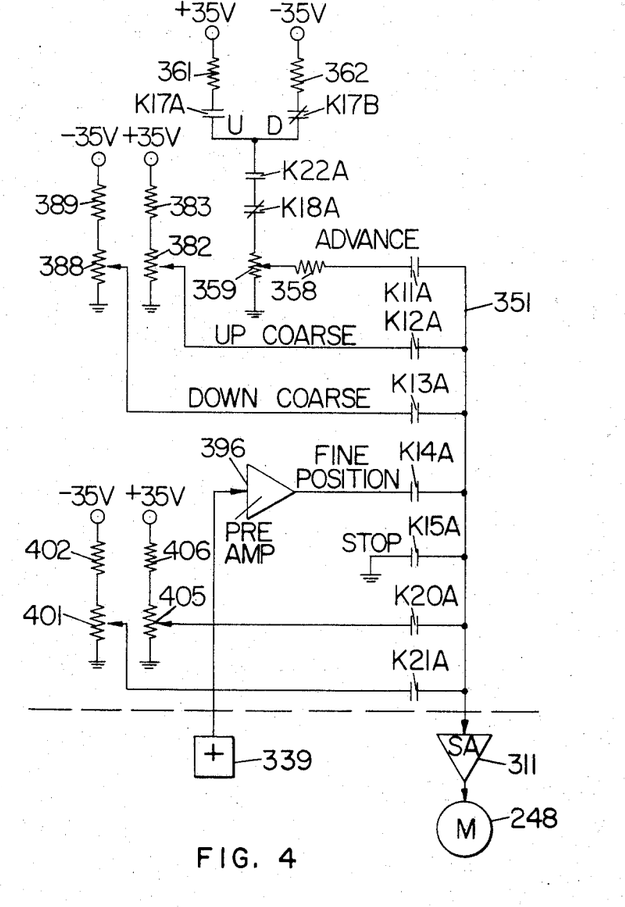
FIGURES 4 and 5, taken together, are a schematic diagram, partly in block form, of the servo control assembly shown in block form in FIGURE 3b.

FIGURES 4 and 5, taken together, show the servo control assembly 312 in more detail. Referring first to FIGURE 4, there is shown a conductor 351 connected to the input of the servo amplifier 311. Several normally open relay contacts are connected to the conductor 351. Any one of them may be closed at any one time by energization of the appropriate relay winding so as to select the desired input for the servo-amplifier 311. These relays and contacts constitute the switching mechanism previously shown schematically in FIGURE 3b as the switch 313.

Figure 5:
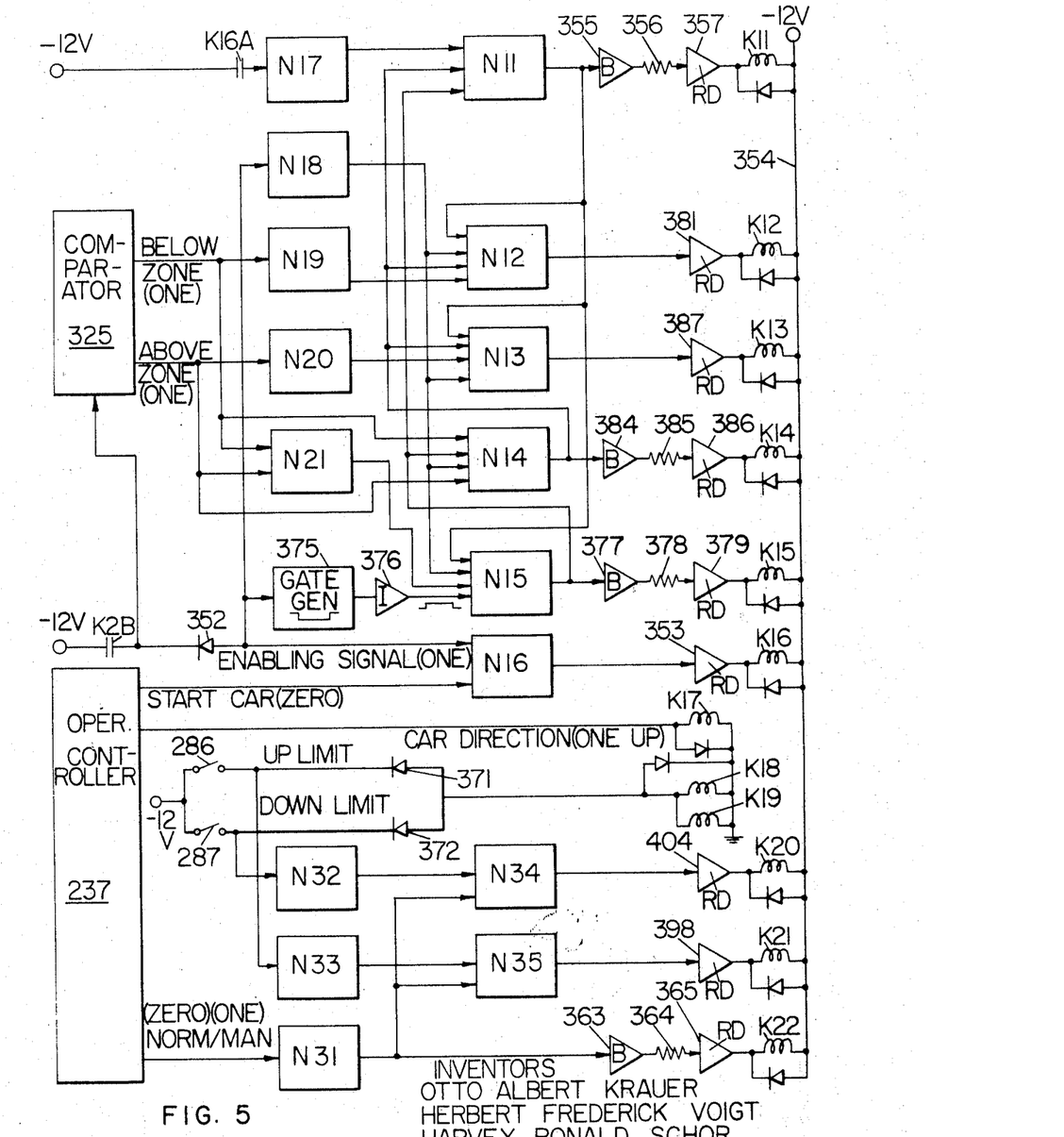

The apparatus of FIGURES 4 and 5 can be understood most readily by considering an example. Let us assume again that the elevator car is at the first floor, is about to go up, and that no stopping signal prior to the twentieth floor is registered. First, the operations controller 237 (FIGURE 5) generates a "start car" signal which is "zero" when the car is to be started, and which is connected as one input to a "NOR" circuit N16. The formerly mentioned contact K2B is connected, through a diode 352, to a second input of the "NOR" circuit N16. Since contacts K2B are open at this time (they are closed when a stop is to be made), both inputs to "NOR" circuit N16 are "zero" and its output, which is "one" is passed to a relay drive amplifier 353. A relay winding K16 has one terminal connected to a conductor 354 which in turn is connected to a −12 volt source. The other terminal of winding K16 is connected to the output of the relay drive amplifier 353 which is now "zero." Winding K16 is energized, closing contact K16A, one terminal of which is connected to a −12 volt source and the other terminal of which is connected as the sole input to a "NOR" circuit N17. Accordingly, the output of this circuit is "zero" and constitutes one of three inputs to a "NOR" circuit N11. The other two inputs are also "zero" at this time for reasons which will appear. The output of circuit N11 is "one" and is passed through a buffer amplifier 355 and through a resistor 356 to the input of a relay drive amplifier 357, the "zero" output of which is connected to one terminal of a relay winding K11, the other terminal of which is connected to the conductor 354. Accordingly, relay winding K11 is energized, closing contact K11A. The contact K11A represents the "advance" position. One terminal of this contact is connected to the conductor 351 while the other terminal is connected through a resistor 358 to the wiper of a potentiometer 359 one terminal of which is grounded and the other terminal of which is connected through a normally closed contact K18A to a normally open contact K22A. The contact K22A is connected through a normally open contact K17A and through a resistor 361 to a source of positive potential; the contact K22A is also connected through a normally closed contact K17B and through a resistor 362 to a source of negative potential. The "car direction" signal from the operations controller, which is "one" for up, is connected to one terminal of a relay winding K17 the other terminal of which is grounded with the result that the relay K17 is energized, the contact K17A is closed, and the contact K17B is opened. The normal/manual signal from the operations controller, which is now "zero" for normal, is connected as the sole input to a "NOR" circuit N31 the output of which is "one" and is connected through a buffer amplifier 363 and a resistor 364 to the input of a relay drive amplifier 365. The output of the relay drive amplifier is accordingly "zero" and is connected to one terminal of a relay winding K22 the other terminal of which is connected to the conductor 354. Accordingly, the relay K22 is energized and the contact K22A is closed. The previously mentioned limit switches 286 and 287 operated by the difference shaft 246 each have one terminal connected to a −12 volt source while the other terminals are connected through diodes 371 and 372 respectively to one terminal of each of two relays K18 and K19 the remaining terminals of which are grounded. It is apparent that the relay K18 is deenergized unless the shaft 246 is at one of its limits of travel, and therefore contact K18A is closed.

Summarizing the above described circuits, upon the receipt of a "start car" signal, the contact K11A is closed, a positive voltage is applied to the servo-amplifier 311 and the motor 248 advances the shaft 245. When the shaft 246 (FIGURES 2 and 3) approaches its limit of travel, one of the switches 286 or 287 closes thereby energizing relay K18, opening the contact K18A, and disconnected the positive voltage from the input to the servo-amplifier 311. The motor 248 stops until the elevator car 228 drives the shaft 246 sufficiently to reopen the switch whereupon the relay K18 is deenergized, the contact K18A is closed, and the motor 248 again drives the shaft 245. This alternate advancing and stopping, which occurs near the limit of travel of the shaft 246, continues until a stopping signal is received.

When the advancer shaft 245 approaches a position corresponding to the twentieth floor, the succession of events previously described in connection with FIGURES 2 and 3 causes the generation of an enabling signal by the closure of contact K2B (shown both in FIGURE 3b and FIGURE 5). The voltage from the −12 volt source passes through the contact K2B and the diode 352 to one input of the "NOR" circuit N16. This signal is a "one" and since the "start car" signal is absent the other input is also "one." Accordingly the output of the "NOR" circuit N16 is "zero" as a result of which the relay K16 is deenergized thereby opening the contact K16A and deenergizing the relay K11. The subsequent opening of contact K11A removes the positive voltage from the conductor 351.

Another result of the opening of contact K16A is that the output of the "NOR" circuit N11 is now "zero" and is connected as a first input to a "NOR" circuit N15. The enabling signal from the contact K2B is also connected to a gate generator 375 which in response to this signal generates a negative gate having a duration which may be adjusted within a range of about 15 to 85 milliseconds. The output of the gate generators 375 is passed through an inverting amplifier 376 so as to obtain a positive going gate which is connected as another input to the "NOR" circuit N15. The enabling signal is also connected as the sole input to a "NOR" circuit N18 the output of which, "zero" during the presence of the enabling signal, is connected as another input to the "NOR" circuit N15. The two outputs of the comparator 325 are connected to the inputs of a "NOR" circuit N21. If the shaft 245 is either above or below the fine position zone, one of these inputs will be a "one" making the output of the "NOR" circuit N21 "zero," which output is connected as a final input to the "NOR" circuit N15. Since all of the inputs to the "NOR" circuit N15 are "zero" the output is "one" and is passed through a buffer amplifier 377 and a resistor 378 to a relay drive amplifier 379 the output of which is connected to one terminal of a relay winding K15 the other terminal of which is connected to the conductor 354.

The relay K15 is therefore energized closing the contact K15A and grounding the conductor 351 which, it will be recalled, is connected to the input of the servo-amplifier 311. In other words, upon receipt of a stop signal the input is grounded unless the shaft 245 is within the fine position zone which it will be if it is neither "above" nor "below" this zone. The relay K15 remains energized until either the end of the gate or until the shaft 245 is within the fine position zone.

In general the shaft 245 will not stop in the fine position zone but will be either above or below it. If below, the "one" signal indicative thereof from the comparator 325 will make the input to a "NOR" circuit N19 "one" and the output thereof "zero." This output constitutes one input of a "NOR" circuit N12. The top input to the circuit N12 is "zero" because the opening of contact K16A made the output of "NOR" circuit N11 "zero." The next input to "NOR" circuit N12 is "zero" because the presence of the enabling signal has made the output of "NOR" circuit N18 "zero." The last input to "NOR" circuit N12 is "zero" because the shaft is not in the fine position zone. More particularly, the "one" signal from the comparator is also passed to the "NOR" circuit N14 making its output "zero" and this output is connected to the last input of the "NOR" circuit N12. Since all inputs are "zero" the output of "NOR" circuit N12 is "one" and is connected to the input of a relay drive amplifier 381 the output of which is thereby made "zero" thus energizing the winding of a relay K12. Closure of the contact K12A constitutes the "Up Coarse" condition of the servo control assembly. One terminal of the contact K12A is connected to the conductor 351 while the other terminal is connected to the wiper of a potentiometer 382 one terminal of which is grounded and the other terminal of which is connected through a resistor 383 to a source of positive voltage. Therefore a positive voltage is placed on the input of the servo-amplifier 311 which energizes the motor 248 to drive the shaft 245 "up" until the shaft enters the fine position zone at which time the "below zone" signal becomes "zero." This operates through circuits N19 and N12 to deenergize the relay K12. Since the shaft is neither above nor below the fine position zone both the top and the bottom inputs of "NOR" circuit N14 are "zero"; the next to the top input is "zero" because the output of "NOR" circuit N21 is "one" thereby making the output of "NOR" circuit N15 "zero"; the next input of "NOR" circuit N14 is "zero because the enabling signal has made the output of "NOR" circuit N18 "zero." Since all inputs to circuit N14 are "zero," the output is "one" which output is passed through a buffer amplifier 384 and a resistor 385 to a relay drive amplifier 386 the output of which is driven "zero" thereby energizing relay winding K14.

If, instead of being below the fine position zone the shaft 245 had been above the zone, a similar circuit including "NOR" circuits N20 and N13 and a relay drive amplifier 387 would have energized relay winding K13. Closure of contact K13A would have placed a negative potential upon a conductor 351 by way of potentiometer 388 and resistor 389. The shaft would then have been driven down until it reached the fine position zone.

Energization of the relay winding K14 closes contact K14A which connects the output of a pre-amplifier 396 to the input of the servo-amplifier 311. The pre-amplifier 396 is a high gain, stable, low drift, direct coupled amplifier the input of which is connected to the output of the summing circuit 339 in order to amplify the low level error signal before its application to the servo-amplifier 311. The motor 248 is now energized to position the shaft 245 so that the output voltage of the fine position potentiometer 268 or 269 is equal to the output voltage of the fine floor reference voltage potentiometer 284. At this time the shaft 245 is positioned precisely at a position corresponding to the twentieth floor. The shaft will remain at this position until the next "start car" signal is received from the operations controller.

Returning to the "advance" position it will be recalled that it was explained that upon receipt of a stop signal the upper input of the "NOR" circuit N11 was "zero" and it was assumed that the other two inputs also were "zero." The reason that these inputs are "zero" can now be explained. The middle input is connected to the output of the "NOR" circuit N14 and therefore is "zero" because the starting of the car caused the deenergization of relay K2 through the circuit shown in FIGURE 3b. Briefly, the input to the "NOR" circuit N8 (FIGURE 3b) became "zero" while its output became "one" thereby placing a "one" on an input to "NOR" circuit N7 thereby making its output "zero" thus deenergizing relay K2. Returning to FIGURE 5, since the contact K2B is open, the input to "NOR" circuit N18 is "zero," the output is "one," one input to "NOR" circuit N14 is "one" so that this output is "zero.' Therefore, the middle input of "NOR" circuit N11 is "zero." The bottom input is "zero" because, with contact K2B open, there can be no gate and one of the inputs to "NOR" circuit N15 is "one" causing its output to be "zero." The latter output is the remaining input to the "NOR" circuit N11. The two inputs to the "NOR" circuit N11 just described above constitute interlocks to prevent faulty operation.

There are times when it is necessary to operate the elevator car manually. Such times occur during inspection, servicing, the making of repairs, etc. At this time the selector should not be fully operative. It will be recalled in connection with FIGURE 3b that upon receipt of a "manual" signal from the operations controller, a "one" input was applied to the "NOR" circuit N7 thereby preventing the energization of the relay K2 which in turn prevents the operation in the "advance" mode. However, although the selector is not fully operative, the movement of the elevator car drives the shaft 241 (FIGURES 2 and 3b) and, through the differential 244, drives the shaft 246. The latter shaft is only capable of a limited amount of rotation before mechanical stops on the distance-to-go potentiometers are engaged. It is therefore necessary to turn the shaft away from these stops. This is accomplished by a circuit which utilizes the same limit switches 286 and 287.

As shown in FIGURE 5, receipt of a "manual" signal places a "one" input on the "NOR" circuit N31 whose output is therefore "zero." This output operates through the buffer amplifier 363 and the relay drive amplifier 365 to deenergize the relay K22 thus opening contact K22A and disabling the regular "advance" circuit. Additionally, the "zero" output of the circuit N31 is applied as an input to each of the "NOR" circuits N34 and N35. If the shaft 246 is driven, for example, to its upper limit the switch 286 will close thereby placing a "one" input on the circuit N33 and placing a "zero" output on the "NOR" circuit N35. The output of the latter circuit is of course a "one" which operates through the relay drive amplifier 398 to energize a relay K21. Contact K21A has one terminal connected to the conductor 351 while the other terminal is connected to the wiper of a potentiometer 401 one terminal of which is grounded and the other terminal of which is connected through a resistor 402 to a source of negative voltage. Therefore, motor 248 is energized to drive the shaft down. Similarly, if the shaft 246 were driven to its lower limit, the switch 287 would operate through "NOR" circuits N32 and N34 and the relay drive amplifier 404 to energize a relay K20. Closure of contact K20A would place a positive voltage on the conductor 351 through a potentiometer 405 and a resistor 406. The motor 248 would then be energized to drive the shaft up.

*The comparator*

FIGURE 6 is a schematic block diagram of the comparator 325. The previously mentioned enabling signal from relay contact K2B (FIGURES 3b and 5) is connected to the input of a relay drive amplifier 411. When the signal is present, the input to the amplifier 411 is "one," making the output "zero," thereby energizing a relay K25. Closure of contact K25A and opening of contact K25B disconnects ground and connects the voltage from the coarse floor reference voltage potentiometer corresponding to the selected floor to the input of a stable direct coupled booster amplifier 412, the output of which is connected to one input of a summing circuit 413. The voltge from the wiper of the coarse advancer shaft position potentiometer 257 is connected to the input of another booster amplifier 414, the output of which is connected to a second input of the summing circuit 413. The output of the latter circuit is an error signal representing by its polarity the sense and by its magnitude the extent of the deviation of the position of the shaft 245 from that position corresponding to the selected floor at which a stop is to be made. This error signal is connected to the input of a stable, low drift, direct coupled amplifier 415, the output of which is connected to the inputs of each of two difference amplifiers 416 and 417. The amplifier 416 detects the difference between the error signal and a reference voltage and in response thereto controls the state of a flip flop circuit 421. The polarity and magnitude of the reference voltage are selected so that when the shaft 245 is below the lower limit of the fine position zone, the flip flop 421 is urged to its first state whereas when the shaft 241 is above the lower limit of the fine position zone, the flip flop 421 is urged to its second state. That output is selected which is "one" when in its first state, and is connected to the input of a relay drive amplifier 422 the output of which is connected to one terminal of a relay winding K26 the other terminal of which is connected to a −12 volt source. Therefore, when the shaft 245 is below the lower limit of the fine position zone, the relay K26 is energized, closing contact K26A, one terminal of which is connected to a −12 volt source and the other terminal of which constitutes the "below zone" output of the comparator.

The difference amplifier 417 similarly detects the difference between the error signal and a reference voltage and controls the state of a flip flop circuit 423. The polarity and magnitude of the reference voltage applied to the amplifier 417 are selected so that when the shaft 245 is above the upper limit of the fine position zone, the flip flop 423 is urged to its first state while when the shaft 245 is below the upper limit of the fine position zone, the flip flop 423 is urged to its second state. That output is selected which is "one" when the flip flop 423 is in its first state and is connected to the input of a relay drive amplifier 424 the output of which is connected to one terminal of a relay winding K27 the other terminal of which is connected to a −12 volt source. Accordingly, when the shaft 245 is above the upper limit of the fine position zone, the relay K27 is energized, closing contact K27A, one terminal of which is connected to the −12 volt source and the other terminal of which constitutes the "above zone" output of the comparator 325.

One of the advantages of the present selector is, as previously mentioned, that many of the adjustments can be made in the factory and that the adjustments required to be made at the job site are comparatively simple. Let it be assumed that a selector as above described has been built, tested for proper operation, and placed in stock. Next let it be assumed that this selector has been assigned to a particular installation and that information as to the number of floors, the height of each above a datum level, and the rated car speed, are available. Consider the adjustments necessary.

*Factory adjustments*

Each of the coarse floor reference voltage potentiometers 273, 274, etc. is adjusted so that the voltage of its wiper represents, to the previously selected scale, the height of the corresponding floor. Next, the shaft 246 is manually placed in its zero, or reference position at which the wipers of the distance-to-go potentiometers 301 and 302 are at their center postions. Next the shaft 246 may be manually moved various scale distances to either side of the reference position and the switches, such as the switches 294, 295 and 296, adjusted. It will be understood that the showing in FIGURE 2 is schematic and that there may be many switches operated at each of several scale factors and that the distances from zero at which each operates will depend upon the requirements of the particular hoist motor control system 239 to be used. Typically, the switches may include one which operates as soon as the shaft is displaced to either side of zero, to provide the "scanning started" signal; others which operate at either side of zero to define "door" zones and "leveling" zones; and two others which are actuated, one at either side of zero, at the minimum stopping distance for rated car speed, that is, the minimum distance from the floor at which stopping must be initiated when the car is traveling at rated speed. The limit switches 286 and 287 are adjusted to operate at the maximum desired displacement of the shaft 246, which, of course, will be somewhat greater than the above mentioned minimum stopping distance.

Next, a floor, such as the first floor, is selected. The shaft 246 is temporarily clamped in its zero position. Since there is no tape 229 connected, the shaft 245 may be moved freely and is moved until the potential of the coarse advancer shaft position potentiometer 257 is equal to that of the first floor coarse reference voltage potentiometer 273. Now the shaft 245 is neither above nor below but is within the fine position zone. That one of the potentiometers 268 or 269 is selected, the wiper of which is farthest from the transition point, by means of the first floor A-B switch shown in FIGURE 3a. The voltage of the selected potentiometer will not, in general, be the same as that of the first floor fine reference voltage potentiometer 281, but this can be corrected easily. A stop is simulated by manually closing a switch simulating the first floor switch 304 in the operations controller. The advancer motor control system 249 will then energize the motor 248 to drive the shaft 245 away from the position just set. The potentiometer 281 is now adjusted until the shaft 245 is driven back, that is, until the voltage of the potentiometer 257 is again equal to the voltage of the potentiometer 273. The position of the shaft 245 is now very nearly at its first floor position, subject only to a possible small correction later, but close enough for present purposes. Now the first floor switch 261 is positioned opposite to the magnet 256. The other switches 262, 263, etc. are now positioned at scale distances from the switch 261.

*Job site adjustments*

It is now assumed that the elevator car, hoist motor, selector, and all other components are installed at the job site. With the steel tape 229 disconnected and with the hoist motor control system disconnected from the selector, the car is moved to be level with the first floor landing. The shafts 246 and 245 are turned to their zero and first floor positions respectively, as above described. The tape 229 is now operatively connected to the car and the sprocket 231. It may be necessary to turn the sprocket 231 slightly to permit its teeth to enter sprocket holes in the tape 229, causing either or both of the shafts 245 and 246 to be moved slightly, thereby disrupting their relative positions, but this is easily corrected. The hoist motor control system 239 is connected to be controlled by the distance-to-go signals from the selector potentiometers 301 and 302. A stop signal is simulater by closing the switch 304 whereupon the advancer motor control system 249 energizes the motor 248 to position the shaft 245 until the voltage of the selected one of the potentiometers 268 or 269 is again equal to that of the potentiometer 281. Such movement may displace the shaft 246 away from its former position whereupon signals from the potentiometers 301 and 302 will cause the hoist motor control system 239 to energize the hoist motor 221 to drive the car to a new position, slightly away from the landing. If so, the potentiometer 281 is trimmed until the car is again level with the landing.

Without disconnecting the steel tape 229 but with the hoist motor control system electrically disconnected from the selector, with the advancer motor control system 249 deenergized, and with the shaft 246 clamped in its zero position, the elevator car 228 is brought level with the second floor landing. The magnet 256 should be opposite the switch 262 but if not, the latter is repositioned. The proper one of potentiometers 268 or 269 is selected as before. The hoist motor control system 239 is now reconnected to the selector, the shaft 246 unclamped, and the advancer motor control system 249 energized. The voltage of the potentiometer 257 is close enough to that of the potentiometer 274 so that upon simulation of a stop at the second floor by closure of the switch 305, the relays K12 and K13 (FIGURES 4 and 5) remain deenergized while the relay K14 becomes energized. The motor 248 repositions the shaft 245 until the voltage of the selected one of potentiometers 268 or 269 equals that of the potentiometer 282. This repositioning will in general cause a displacement of the shaft 246 and consequent energization of the hoist motor 221, thereby displacing the car from the landing. The fine floor reference potentiometer 282 (FIGURE 2) is now adjusted until the car 228 is again level with the landing.

The car is moved to succeeding landings at each of which the corresponding fine floor reference voltage potentiometer is adjusted.

It is apparent from the above that the on-the-job adjustments of the selector consist primarily in adjusting each of the fine floor reference voltage potentiometers until the car is level with the landing. This adjustment is simple and can be performed quickly with a great saving in time and money as compared to the field adjustments required with former selectors.

It is to be noted that the selector of the present invention positions a shaft (the shaft 246) with sufficient accuracy so that its position can be used both to control initial slowdown and to control final leveling of the elevator car. No auxiliary final leveling devices, such as separately driven leveling cams in the machine room, or auxiliary switches in the hatch, are required.

The selector has been described without prescribing any limit as to the height of the hoistway or the number of floors which can be accommodated. In some places a 600 foot hoistway has been mentioned as illustrative and the apparatus as described is suitable for such a hoistway. The apparatus can be modified to accommodate a hoistway of twice this height without making the size of the selector unmanageable.

It has been found that the assembly comprising the sprockets 252 and 254, the belt 253, the magnet 256 and the switches 261, etc. (FIGURE 2), suitable for use with a 600 foot hoistway, can easily be constructed to occupy a space no more than 30 inches by 8 inches by 3 inches. An assembly suitable for use with a 1,200 foot hoistway can be made by providing an additional belt and an additional pair of sprockets, mounted on extensions of the same shafts as the sprockets 252 and 254. When provided with another set of floor switches, the assembly occupies a space only 30 inches by 8 inches by 6 inches. One or the other of the two groups of floor switches is rendered effective by transferring the voltage source between groups by a suitable switch actuated by the advancer shaft 245 at an appropriate gear ratio. The other required modifications, such as the provision of an additional coarse advancer shaft position potentiometer to supplement the potentiometer 257 and the provision of additional floor relays and switches, do not unduly increase the bulk of the selector.

Use with servo hoisting mechanism

It has been mentioned that the selector of the present invention is suitable for use in an elevated system in which the hoist motor is part of a servo mechanism. Such a system typically comprises a high gain, closed loop system in which the hoist motor is controlled in accordance with an input signal. One such system is described in the copending application of Otto Albert Krauer et. al., Ser. No. 495,585, filed concurrently herewith, for "Elevator Control System," and assigned to the same assignee as in the instant application. During starting, acceleration and running the input signal may (as it does in the system of the cited application) represent desired velocity as a function of time and the system causes the elevator car to run at the dictated velocity. The signal must, of course, vary in such a way that not only velocity but also acceleration and rate of change thereof are kept within acceptable limits and vary in a predetermined, desired manner.

When the car is to be stopped, the input signal must be controlled in accordance with distance because the car is required to stop, not at a predetermined time, but at a predetermined place. The input signal must vary with distance in such a way that the desired velocity, and time derivatives thereof, are obtained at all times. The present invention is particularly suitable for generating such a signal. It has been found that the angular position of the shaft 246 is an extremely accurate indication of the distance of the car from the selected landing and that the potentiometers 301 and 302 can be constructed to provide signals of the proper form and with sufficient accuracy to control the servo mechanism so as to decelerate the car from a high speed and bring it to a smooth stop at the selected landing. There is no need to provide auxiliary distance sensing devices such as helical cams in the machine room or hatchway vanes or switches either to stop the car level with landing in the first instance or to maintain it level despite load changes.

Summary

From the foregoing it is apparent that the present invention provides a selector having many highly desirable features. For example, the present selector is more compact than prior selectors serving an equal number of floors. Instead of following the construction of many prior selectors in which synchronous and advancer carriages or panels travel linearly up and down along a path representing the hoistway to a reduced scale, the advancer of the present invention travels along a path which changes direction. More particularly, the path of the magnet 256 on the belt 253 includes both straight and curved portions. It would be possible to use a large wheel with a cicrumference approximately equal to the length of the belt 253, but the configuration illustrated and described is preferred at present.

Another feature contributing to the compactness of the invention is the way in which the length of the hoistway accommodated can be doubled by providing two sets of sprockets, belts, magnets and switches. Since there is no mechanical latching or locking of the advancer mechanism, it is possible to select the desired set by a simple electric switch. Thus, doubling the height of the hoistway accommodated adds only about three inches to one dimension of one component, instead of doubling what is usually the largest dimension of the selector.

It is to be noted that, since there is no mechanical latching, there are no stresses caused by impact and accordingly the apparatus may be made quite light. This in turn reduces the wear on the driving tape 229 and its associated parts.

It is also to be noted that the accuracy of the signals generated is not dependent upon the scale factor at which the magnet 256 is translated or upon the accuracy with which the switches 261, etc. are located, because these factors do not determine the position of the shaft 245 during the stopping operation. The shaft 245 is positioned by a servo mechanism in response to voltages developed elsewhere, namely, in the shaft position potentiometers and the floor reference voltage potentiometers.

It is also to be noted, as a sort of by-product, that an additional belt, magnet, set of switches and pair of sprockets, connected to be driven by the shaft 241, would provide an unusually compact source of car position signals.

Although a specific embodiment of the invention has been described in considerable detail for illustrative purposes, many modifications can be made without departing from the spirit of the invention. For example, although it is preferred at present that the switches 261, 262, etc. be reed switches operated by the proximity of the magnet 256, other arrangements such as photoelectrically operated switches or simple brush contact switches could be used. Many other modifications will occur to those skilled in the art. It is therefore desired that the protection afforded by Letters Patent be limited only by the true scope of the appended claims.

What is claimed is:

1. A landing selector arrangement for use in an elevator system to control elevator car actuating and stopping mechanism to decelerate and to stop a car at selected ones of a plurality of landings in response to the generation of signals to stop at said landings, comprising:
    a first member movable in synchronism with the movement of said car,
    a second member movable in advance of said first member searching for landings for which signals to stop said car are generated,
    a third movable member,
    means positioning said third member continuously in accordance with the difference between the positions of said first and second members,
    means responsive to a signal to stop said car at a selected one of said landings stopping said second member preparatory to stopping said car at said selected landing,
    means continuously controlled by said third member and operable when said second member it stopped for generating throughout the deceleration of said car and until it stops at said selected landing a continuous signal indicative of the distance of said car from said selected landing,
    said continuous signal being suitable to control said car actuating and stopping mechanism to decelerate said car, to stop said car at said selected landing, and to maintain said car level with said landing.

2. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:
    a first movable member, moved in synchronism with the movement of said car,
    a second movable member,
    means responsive to a car starting signal moving said second member with respect to said first member,
    a third movable member,
    means positioning said third member continuously in accordance with the difference between the positions of said first and second members,
    means responsive to a signal to stop said car at a selected one of said landings stopping said second member preparatory to stopping said car at said selected landing, and
    means continuously controlled by said third member and operable when said second member is stopped for generating throughout the deceleration of said car and until it stops at said selected landing a continuous signal indicative of the distance of said car from said selected landing.

3. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable member, moved in synchronism with the movement of said car, a second movable member, means responsive to a car starting signal moving said second member a limited amount with respect to said first member, a third movable member, means positioning said third member continuously in accordance with the difference between the positions of said first and second members, means responsive to a signal to stop said car at a selected one of said landings stopping said second member at a position corresponding to said selected landing, means continuously controlled by said third member and operable when said second member is stopped for generating throughout the deceleration of said car and until it stops at said selected landing a continuous signal indicative of the distance of said car from said selected landing and for generating a plurality of discrete signals as said car reaches each of a plurality of predetermined distances from said selected landing, said continuous signal and said discrete signals being suitable to control said car actuating and stopping mechanism to decelerate said car and to stop said car at said selected landing.

4. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable member, moved in synchronism with the movement of said car, a second movable member, means responsive to a car starting signal moving said second member a limited amount with respect to said first member, said second member thereby being movable into a plurality of positions, each one of which corresponds to a different one of said landings, a third movable member, means positioning said third member continuously in accordance with the difference between the positions of said first and second members, means jointly responsive to a signal calling for a stop at a selected one of said landings and to the approach of said second member to a position corresponding to the same selected one of said landings positioning said second member precisely at said position corresponding to said same selected landing, and means continuously controlled by said third member and operable when said second member is stopped for generating throughout the deceleration of said car and until it stops at said selected landing a continuous signal indicative of the distance of said car from said selected landing.

5. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first member moved in synchronism with the movement of said car, a second movable member, a motor operatively connected to said second movable member, a servo amplifier controlling said motor, means including said servo amplifier and responsive to a car starting signal controlling the energization of said motor to move said second member a limited amount with respect to said first member, said second member thereby being movable into a plurality of positions, each one of which corresponds to a different one of said landings, a third movable member, means positioning said third member continuously in accordance with the difference between the positions of said first and second members, means responsive to a signal to stop said car at a selected one of said landings generating an error signal indicative of the difference between the actual position of said second member and the position corresponding to said selected one of said landings, means operable preparatory to stopping said car at said selected landing for applying said error signal to said servo amplifier whereby said motor is energized to position said second member at said position corresponding to said selected landing, and means continuously controlled by said third member and operable when said second member is positioned as aforesaid for generating throughout the deceleration of said car and until it stops at said selected landing a continuous signal indicative of the distance of said car from said selected landing.

6. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable member, moved in synchronism with the movement of said car, a second movable member, a motor operatively connected to said second movable member, said second member being movable into a plurality of positions representing, to a reduced scale, various positions in the hoistway served by said car, said positions including a plurality of points each representing a different one of said landings, a servo amplifier connected to control the energization of said motor, means including said servo amplifier and responsive to a car starting signal controlling the energization of said motor to move said second member a limited amount with respect to said first member, a third movable member, means positioning said third member continuously in accordance with the difference between the positions of said first and second members, means including said servo amplifier jointly responsive to a signal calling for a stop at a selected one of said landings and to the approach of said second member to that point corresponding to said selected landing controlling the energization of said motor to position said second member precisely at said last named point, and means continuously controlled by said third member and operable when said second member is positioned at said point for generating throughout the deceleration of said car and until it stops at said selected landing a continuous signal indicative of the distance of said car from said selected landing.

7. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable member, moved in synchronism with the movement of said car, a second movable member, means responsive to a starting signal moving said second member a limited amount with respect to said first member, said second member thereby being movable into a plurality of positions each of which represents a corresponding point in said hoistway including a reference point and each of said landings, a third movable member, means positioning said third member continuously in accordance with the difference between the positions of said first and second members, means storing a plurality of fixed signals each indicative of the distance of a different one of said landings from said reference point in said hoistway, means generating a position signal indicative of the displacement of said second member from that position representing said reference point, means jointly responsive to a signal calling for a stop at a selected one of said landings and to the approach of said second member to that position corresponding to the same selected one of said landings positioning said second member to make said position signal equal to that fixed signal indicative of the distance of said selected landing from said reference point, and means continuously controlled by said third member and operable when said second member is positioned as aforesaid for generating throughout the deceleration of said car and until it stops at said selected landing a continuous signal indicative of the distance of said car from said selected landing.

8. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable member, moved in synchronism with the movement of said car, a second movable member including two interconnected elements, a motor operatively connected to said second movable member, one element of said second member being movable by said motor along a path representing, to a reduced scale, the hoistway served by said car, said path including a plurality of points one representing a reference point in said hoistway and each of the others representing a different one of said landings, a servo amplifier connected to control said motor, means responsive to a car starting signal controlling said servo amplifier to energize said motor so as to move said second member a limited amount with respect to said first member, a third movable member, means continuously positioning said third member in accordance with the difference between the positions of said first member and the other element of said second member, means storing a plurality of fixed signals each indicative of the distance of a different one of said landings from said reference point in said hoistway, means generating a position signal indicative of the displacement of the one element of said second member from the point along said path representing said reference point in said hoistway, means jointly responsive to a signal calling for a stop at a selected one of said landings and to the approach of the one element of said second member to the point along said path representing said selected landing deriving an error signal equal to the difference between said position signal and that fixed signal indicative of the distance of said selected landing from said reference point, said means controlling said servo amplifier in accordance with said error signal, whereby said motor places and holds said second member in a position precisely corresponding to that of said selected landing, and whereby the position of said third member with respect to that of said first member is indicative of the present distance of said car from said selected landing, and means continuously controlled by said third member and operable when said second member is held as aforesaid for generating throughout the deceleration of said car and until it stops at said selected landing a continuous signal indicative of the distance of said car from said selected landing.

9. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first member moved in synchronism with the movement of said car, a second movable member, means responsive to a car starting signal moving said second member a limited amount with respect to said first member, a third movable member, means positioning said third member continuously in accordance with the difference between the positions of said first and second members, means responsive to a signal to stop said car at a selected one of said landings stopping said second member preparatory to stopping said car at said selected landing, means continuously controlled by said third member and operable when said second member is stopped for generating throughout the deceleration of said car and until it stops at said selected landing a continuous signal indicative of the distance of said car from said selected landing, said continuous signal being suitable to control said car actuating and stopping mechanism to decelerate said car and stop it at said selected landing and to maintain said car level with said landing until the occurrence of another car starting signal.

10. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable member, moved in synchronism with the movement of said car, a second movable member, means responsive to a car starting signal moving said second member a limited amount with respect to said first member, a third movable member, means positioning said third member continuously in accordance with the difference between the positions of said first and second members, means responsive to a signal to stop said car at a selected one of said landings stopping said second member preparatory to stopping said car at said selected landing, and means continuously controlled by said third member and operable when said second member is stopped for generating throughout the deceleration of said car and until it stops at said selected landing a signal continuously indicative of the distance of said car from said selected landing and for generating a plurality of discrete signals as said car reaches each of a plurality of predetermined distances from said selected landing.

11. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable shaft, moved in synchronism with and rotated by the movement of said car, a second member including a second movable shaft and an interconnected element, said element being movable along a path corresponding, at a reduced scale, to that traversed by said car, a plurality of switches positioned adjacent to said path, each actuated by said element upon its approach thereto, each switch corresponding to one of said landings and the position of each along said path representing approximately the position of its corresponding landing in the hoistway, means responsive to a car starting signal rotating said second shaft a limited amount with respect to said first shaft, a third movable shaft, means positioning said third shaft continuously in accordance with the difference between the angular positions of said first and second shafts, means responsive to the presence of a signal calling for a stop at a selected landing and to actuation of the corresponding one of said switches positioning said element of said second member precisely at a position corresponding to that of said selected landing, and means continuously controlled by said third shaft and operable when said second member is positioned as aforesaid for generating throughout the deceleration of said car and until it stops at said selected landing a continuous signal indicative of the distance of said car from said selected landing.

12. Apparatus according to claim 11 in which said element of said second member is a permanent magnet and in which said switches are actuatable in response to a change in magnetic field.

13. A landing selector arrangement for use in an elevator system to control elevator car actuating and stopping mechanism which starts a car in response to car starting signals and decelerates and stops it at selected ones of a plurality of landings in response to the generation of signals to stop at said landings, comprising:

a first movable shaft, moved in synchronism with and rotated by the movement of said car, first and second sprocket wheels mounted for rotation with their axes parallel but spaced apart, a toothed endless belt engaging said sprocket wheels and defining a closed path, a movable element fastened to said belt, a plurality of switches, actuatable by said element, each positioned adjacent to the periphery of said belt and each approximating, by its position, the position of a different one of said landings in the hoistway, another movable shaft, a differential mechanism operatively interconnecting said first shaft, said first sprocket wheel and said other shaft so that said other shaft can move relative to said first shaft or to said first sprocket wheel, means responsive to a car starting signal for rotating said first sprocket wheel to move said element whereby said other shaft is moved relative to said first shaft, means jointly responsive to a signal calling for a stop at a selected one of said landings and to actuation of the corresponding one of said switches by said element for positioning said element precisely at a position corresponding to said selected landing, and means continuously controlled by said other shaft and operable when said element is positioned as aforesaid for generating throughout the deceleration of said car and until it stops at said selected landing a continuous signal indicative of the distance of said car from said selected landing.

14. Apparatus according to claim 13 in which said element is a permanent magnet and in which said switches are actuatable in response to a change in magnetic field.

15. In an elevator system for a building hoistway having a plurality of landings including an upper and a lower terminal landing, a motor, a movable member driven by said motor a distance which in accordance with a predetermined scale is proportional to the height of said building hoistway between said terminal landings, a potentiometer having a wiper which is connected to said member and is rotated by the movement of said member through the full range of the usuable resistance portion of its potentiometer progressively from its zero ohms position to its maximum resistance value and through the unusable portion to its zero ohms position again for each predetermined portion less than the total distance said member is driven, a resistance, a tap on said resistance located at a resistance value corresponding to the position in the hoistway of a selected one of said landings, comparison means operable to compare the resistance value corresponding to the position of said selected landing with the resistance value at the wiper of said potentiometer, said comparison means being operable when said member approaches within a predetermined distance of a position corresponding to said selected landing to produce a signal signifying the difference between the two resistance values it is comparing, and means operable in response to said signal for controlling said motor to stop said member at said position corresponding to said selected landing.

16. In an elevator system for a building hoistway having a plurality of landings including an upper and a lower terminal landing, a motor, a movable member driven by said motor a distance which according to a predetermined scale is proportional to at least the height of said building hoistway between said terminal landings, a potentiometer having a wiper which is connected to said member and is rotated by the movement of said member through the full range of the usuable resistance portion of its potentiometer progressively from its zero ohms position to its maximum resistance value and through its unusable portion to its zero ohms position again for each predetermined portion less than the total distance said member is driven, a plurality of resistances, each individual to a different one of said landings, a tap on each said resistance, each said tap being located at a resistance value corresponding to the position in the hoistway of the landing associated with its respective resistance, comparison means operable, when said member approaches within a predetermined distance of a position corresponding to a selected one of said landings, to compare the resistance value at the tap on the resistance associated with said selected landing with the resistance value at the wiper of said potentiometer and to produce in response thereto a signal signifying the difference between the two resistance values it is comparing, and means operable in response to said signal to control said motor to stop said member at the position corresponding to said selected landing.

17. In an elevator system for a building hoistway having a plurality of landings,
a motor,
a member driven by said motor past a plurality of positions at which said member is to stop in order for the elevator system to provide service to said landings,
a potentiometer having a wiper which is connected to said member and is rotated by the movement of said member through the full range of the usable resistance portion of its potentiometer progressively from its zero ohms position to its maximum resistance value and through the unusable portion to its zero ohms position again for each predetermined portion less than the total movement of said member,
a resistance,
a tap on said resistance located at a resistance value corresponding to the position at which said member stops in order for the elevator system to provide service to a selected one of said landings,
comparison means operable to compare the resistance value at the tap on said resistance with the resistance value at the wiper of said potentiometer,
said comparison means being operable when said member approaches within a predetermined distance of the position corresponding to the location of said tap to produce a signal signifying the difference between the two resistance values it is comparing,
and means operable in response to said signal for controlling said motor to stop said member at said position corresponding to the location of said tap.

18. In an elevator system for a building hoistway having a plurality of landings including an upper and a lower terminal landing,
a motor,
a movable member driven by said motor past a plurality of positions at which said member is to stop in order for the system to provide service to said landings,
a first potentiometer having a wiper which is connected to said member and is rotated by the movement of said member through the full range of the usable resistance portion of its potentiometer progressively from its zero ohms position to its maximum resistance value and through its unusable portion to its zero ohms position again for each predetermined portion less than the total movement of said member,
a second potentiometer having a wiper which is connected to said member and is rotated by the movement of said member through the full resistance range of the usable resistance portion of its potentiometer progressively from its zero ohms positioned to its maximum resistance value and through the unusable portion to its zero ohms position again for each predetermined portion less than the total movement of said member,
said first and said second potentiometers being so selected and their wipers being so connected to said member that throughout the total movement of said member whenever the wiper is passing through the unusable portion of its potentiometer the other wiper is passing through the usable position of its potentiometer,
a resistance,
a tap on said resistance located at a resistance value corresponding to the position at which said member stops in order for the system to provide service to a selected one of said landings,
comparison means operable to compare the resistance value at the tap on said resistance with the resistance value at the wiper of a selected one of said potentiometers,
said comparison means being operable when said member approaches within a predetermined distance of a position corresponding to the location of said tap to produce a signal signifying the difference between the two resistance values it is comparing,
and means operable in response to said signal for controlling said motor to stop said member at said position corresponding to the location of said tap.

19. In an elevator system for a building hoistway having a plurality of landings including an upper and a lower terminal landing,
a motor,
a movable member driven by said motor past a plurality of positions at which said member is to stop in order for the system to provide service to said landings,
a first potentiometer having a wiper which is connected to said member and is rotated by the movement of said member through the full range of the usable resistance portion of its potentiometer progressively from its zero ohms positioned to its maximum resistance value and through its unusable portion to its zero ohms position again for each predetermined portion less than the total movement of said member,
a second potentiometer having a wiper which is connected to said member and is rotated by the movement of said member through the full range of the usable resistance portion of its potentiometer progressively from its zero ohms position to its maximum resistance value and through its unusable portion to its zero ohms position again for each predetermined portion less than the total movement of said member,
said first and said second potentiometers being so selected and their wipers being so connected to said member that throughout the total movement of said member whenever one wiper is passing through the unusable portion of its potentiometer the other wiper is passing through the usable portion of its potentiometer,
a plurality of resistances, each individual to a different one of said landings,
a tap on each said resistance, each said tap being located on its respective resistance at a resistance value corresponding to the position at which said member stops in order for the system to provide service to the landing associated with said resistance,
comparison means operable, when said member approaches within a predetermined distance of a position corresponding to the location of a selected one of said taps, to compare the resistance value at said tap with the resistance value at the wiper of a selected one of said potentiometers and to produce in response thereto a signal signifying the difference between the two resistance values it is comparing,
and means operable in response to said signal to control said motor to stop said member at the position corresponding to the location of said selected tap.

References Cited
UNITED STATES PATENTS

| | | | |
|---|---|---|---|
| 2,699,226 | 1/1955 | Bruns | 187—29 |
| 3,051,267 | 8/1962 | Borden | 187—29 |
| 3,080,946 | 3/1963 | Dinning | 187—29 |

ORIS L. RADER, *Primary Examiner.*

W. E. DUNCANSON, *Assistant Examiner.*